Jan. 3, 1967  R. L. GRAY  3,295,762
PLANT PUMP
Filed Dec. 23, 1964  2 Sheets-Sheet 1

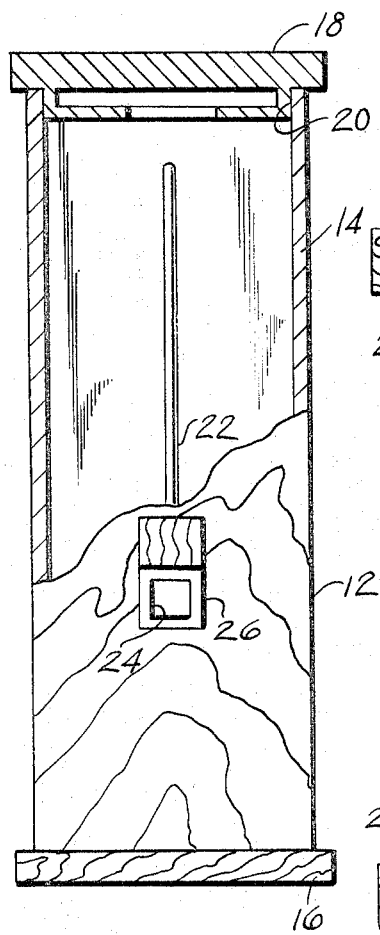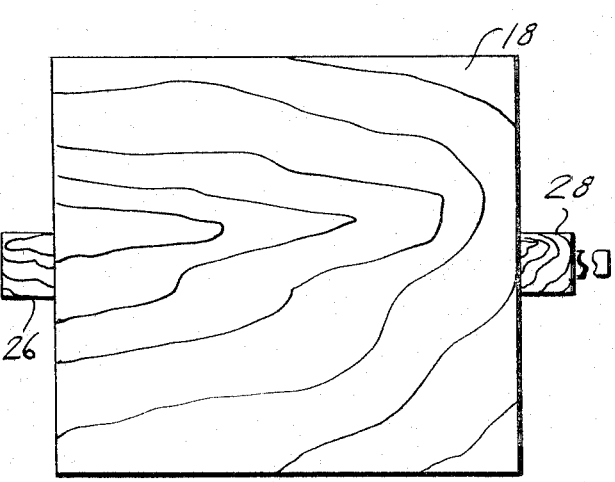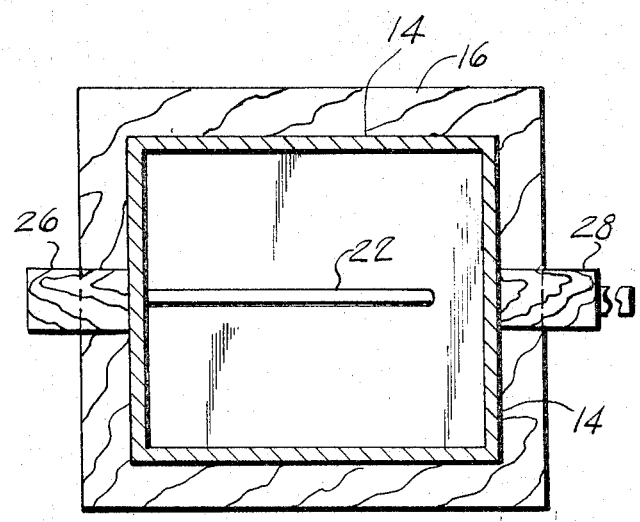

United States Patent Office 3,295,762
Patented Jan. 3, 1967

3,295,762
PLANT PUMP
Richard L. Gray, 623 N. Walnut St.,
Orrville, Ohio 44667
Filed Dec. 23, 1964, Ser. No. 420,640
1 Claim. (Cl. 239—51)

This invention relates to watering devices for plant life.

It is an object of the present invention to provide a plant pump which will be molded of vitreous china or other suitable materials which will hold a suitable amount of water in order to automatically water plants.

Another object of the present invention is to provide a plant pump which will have straw means which will contain a suitable material to allow continuous dripping of water from the pump and the device will provide a metered flow of the water into the soil.

A further object of the present invention is to provide a plant pump of the above described type which will operate through a capillary action and the amount of humidity in the atmosphere governs the amount of water used by the pump and the device will also operate on the principle of the siphon.

Other objects of the invention are to provide a plant pump bearing the above objects in mind which is of simple construction, has a minimum number of parts, is inexpensive to manufacture and efficient in operation.

For other objects and for a better understanding of the invention reference may be had to the following detailed description taken in conjunction with the accompanying drawing, in which:

FIGURE 3 is an end view of FIGURE 1;

FIGURE 4 is a top plan view of FIGURE 1; and

FIGURE 5 is a cross sectional view taken along the lines 5—5 of FIGURE 1.

Figure 1:
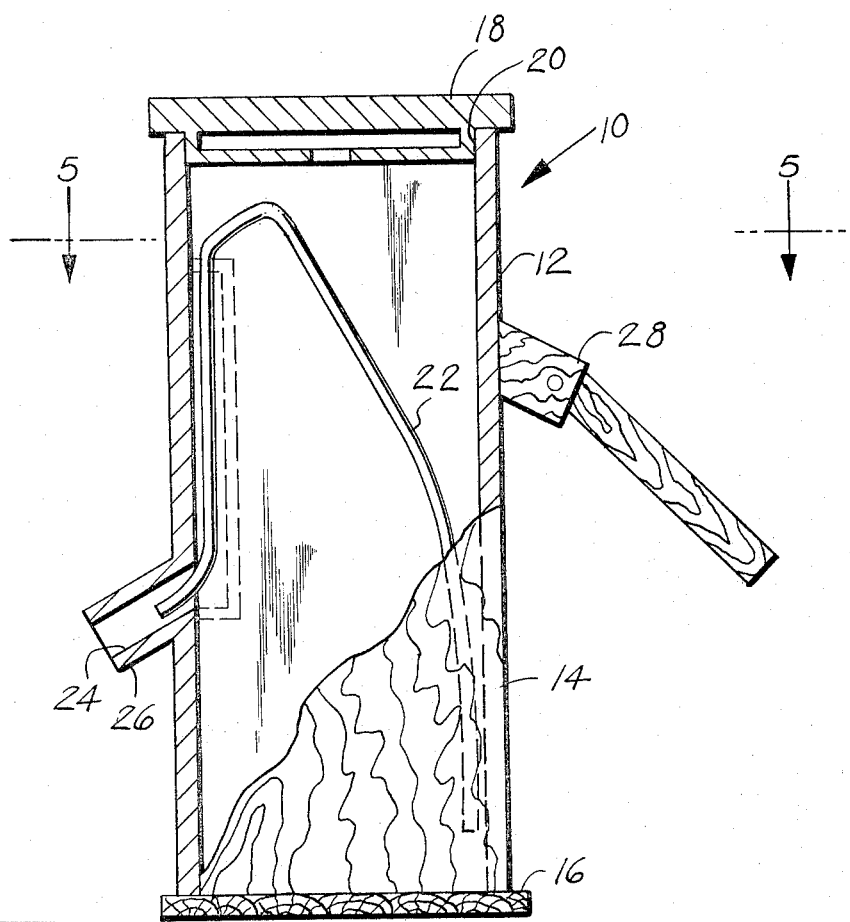
FIGURE 1 is a side view of the present invention shown in elevation and partly broken away.
Figure 2:
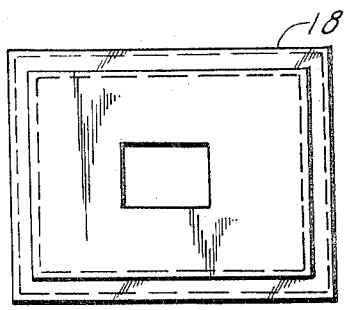
FIGURE 2 is a bottom plan view of the top member shown removed from FIGURE 1.

Referring now more in detail to the drawing, a plant pump 10 made in accordance with the present invention is shown to include a hollow rectangular configurated casing 12 having narrow side walls 14 and a base 16. A flange cover 18 is freely received within rectangular opening 20 of casing 12. Casing 12 provides a means of storing water or other solution for plants and a hollow straw 22 of elongated configuration is received within the hollow interior of casing 12 and one end extends downward towards base 16 and the other end is arcuate in configuration and extends partially into a rectangular opening 24 of spout 26 extending from casing 12 and thus provides a means for water to be drawn continuously from pump 10 by capillary action in combination with a siphoning action. A fibrous or other suitable material fills straw 22 to thus provide the capillary action necessary to operate pump 10. A handle 20 extends from one side of pump 10 and thus allows pump 10 to be easily picked up by an individual.

In operation, cover 18 is removed from opening 20 of pump 10 and the interior is filled with water and with the spout 26 over the container containing plant or ground water is fed by capillary action taking place within straw 22 out of the opening 24 of spout 26 into the soil.

It shall be recognized that pump 10 imparts a metered flow or drip of the liquid to the soil the plant is placed in and plant food such as pellets may be added to the water and thus will be distributed evenly throughout the planter box or other container. Contrary to hand watering of plants the liquid from pump 10 reaches all points of the planter box and is evenly distributed at all levels of the soil and also the soil does not become impacted as it does in hand watering, but remains loose and grainy.

It shall be further recognized that pump 10 can be easily used in the home during the winter months, in conjunction with planter boxes covered with transparent plastic, to form a miniature hot house.

It shall be noted that small gravel and particles of shell may be distributed above the soil and the water or liquid is distributed over the surface of the shell as well as into the soil and the water evaporating from the shells or gravel, creates an induced humidity around the plants, and this humidity or water vapor is absorbed through the pores of the leaf in the plant, thus causing the plant to bud and bloom far more than is usual with plants that are hand watered.

Plant food when introduced through pump 10 need only be used once every six months. In the event that plants cannot be watered for a period such as two weeks or while on vacation, if the plants are watered thoroughly two days before the impending absence, the pump will, if filled just prior to leaving, maintain an adequate moisture level within the planter box to insure the good health of the plants. The heretofore described invention affords continued good care and moisture for the plants or flowers, with a minimum of care and handling by the individual and a once weekly filling of the pump 10 will be more than adequate for the plants, with no danger of too much or too little water being offered the plants.

While various changes may be made in the detail construction, it shall be understood that such changes shall be within the spirit and scope of the present invention as defined by the appended claim.

What I claim as new and desire to protect by Letters Patent of the United States is:

A plant pump for automatic watering of plants comprising, a hollow rectangular casing of vitreous china providing reservoir means for water and plant food, a base closing the bottom of said hollow rectangular casing, a selectively removable cover providing access for the intermittent insertion of water and plant food and limiting the escape of water via evaporation, a spout intermediate the length of said hollow rectangular casing, an angular handle on said hollow rectangular casing providing gripping means for carrying said pump, a continuous hollow arcuate straw within said hollow rectangular casing extending from a position proximate said base to said spout, and a fibrous material in said straw providing capillary action to discharge a metered flow of water from said spout.

References Cited by the Examiner
UNITED STATES PATENTS

| | | | |
|---|---|---|---|
| 1,240,831 | 9/1917 | Doering | 239—51 |
| 2,238,935 | 4/1941 | Gumaer | 239—44 |
| 2,747,332 | 5/1956 | Morehouse | 239—44 |

EVERETT W. KIRBY, *Primary Examiner.*